United States Patent
Lee et al.

(10) Patent No.: US 11,909,946 B2
(45) Date of Patent: Feb. 20, 2024

(54) SWITCHABLE BARRIER AND 3D DISPLAY DEVICE HAVING THEREOF

(71) Applicant: LG Display Co., Ltd., Seoul (KR)

(72) Inventors: Yong-Ku Lee, Paju-si (KR); Wook Jeon, Paju-si (KR); Hee-Jin Im, Paju-si (KR); You-Yong Jin, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 43 days.

(21) Appl. No.: 17/553,494

(22) Filed: Dec. 16, 2021

(65) Prior Publication Data

US 2022/0210394 A1 Jun. 30, 2022

(30) Foreign Application Priority Data

Dec. 28, 2020 (KR) .......................... 10-2020-0185000

(51) Int. Cl.
 *H04N 13/312* (2018.01)
 *H04N 13/359* (2018.01)

(52) U.S. Cl.
 CPC ......... *H04N 13/312* (2018.05); *H04N 13/359* (2018.05)

(58) Field of Classification Search
 USPC .......................................................... 348/51
 See application file for complete search history.

(56) References Cited

U.S. PATENT DOCUMENTS

| | | | | |
|---|---|---|---|---|
| 2013/0342664 | A1* | 12/2013 | Smith | G02B 30/25 348/58 |
| 2014/0078423 | A1* | 3/2014 | Suzuki | G02B 30/27 349/12 |
| 2016/0349562 | A1* | 12/2016 | Hashimoto | G02F 1/134309 |

FOREIGN PATENT DOCUMENTS

| | | |
|---|---|---|
| KR | 10-1090496 B1 | 11/2011 |
| KR | 10-1746859 B1 | 6/2017 |
| KR | 10-2020-0077848 A | 7/2020 |

* cited by examiner

*Primary Examiner* — Mikhail Itskovich
(74) *Attorney, Agent, or Firm* — Birch, Stewart Kolasch & Birch, LLP (57) ABSTRACT

A parallax barrier according to an example can include a first substrate and a second substrate, a liquid crystal layer between the first substrate and second substrate, at least one insulating layer on the first substrate, a first electrode on the second substrate, a second electrode and a third electrode on the insulating layer to generate electric field in order to transmit and block selectively an image, a plurality of first spacers on the first substrate, and a plurality of second spacers on the second substrate. The first spacers and the second spacers can be formed in regions corresponding to each to maintain gap between the first substrate and the second substrate. Further, the first spacers can be spaced apart from the corresponding second spacers by a predetermined distance.

18 Claims, 6 Drawing Sheets

SWITCHABLE BARRIER AND 3D DISPLAY DEVICE HAVING THEREOF

CROSS-REFERENCE TO RELATED APPLICATIONS

This application claims priority to Korean Patent Application No. 10-2020-0185000, filed in the Republic of Korea on Dec. 28, 2020, the contents of which are hereby expressly incorporated by reference in its entirety into the present application.

BACKGROUND OF THE INVENTION

Field of the Invention

This disclosure relates to a switchable barrier and a 3-dimension (3D) display device having the switchable barrier.

Discussion of the Background Art

A 3D display device refers to a system for displaying artificially a 3-dimensional image. The system includes software technology for creating a 3D contents and hardware technology for displaying the 3D content made by the software technology. The reason for including the software technology in the 3D display device is that the 3D contents should be made of the different software for each 3D implementation method in the 3D hardware technology.

The virtual 3D display is a system that enables a virtual three-dimensional effect on flat display hardware by using binocular disparity, which appears when our eyes are about 65 mm apart in the horizontal direction, one of the factors that a person feels a three-dimensional effect. In other word, because of binocular disparity, even when looking at the same object, our eyes see slightly different images (to be precise, each has slightly different spatial information on the left and right). When these two images are transmitted to the brain through the retina, the brain precisely fuses them together so that we can feel a three-dimensional effect. Using the binocular disparity, it is a virtual 3D display that creates a virtual three-dimensional effect through a design that simultaneously displays two left and right images on a 2D display device and sends them to each eye.

In the hardware apparatus of this virtual 3D display device, one channel is outputted one by one while changing the lines one by one in either the horizontal or vertical direction on one screen to display image of two channels in one screen. When the images of two channels are simultaneously output to one display device, the right image is input to only the right eye and the left image is input to only the left eye in glass-free type 3D technology. Further, in glass type 3D technology, the right image inputting to the left eye is blocked and the left image inputting to the right eye by a specific glass corresponding to each of various types of the stereoscopic 3D method.

As such, one of the most important factors in which a person feels a sense of three-dimensionality and depth is the binocular disparity caused by the distance between the two eyes. In addition to binocular disparity, three-dimensionality and depth have a deep relationship with psychological and memory factors. In addition, the three-dimensional realization method can be divided into a volumetric type, a holographic type, and a stereoscopic type based on how much 3D image information can be provided to the observer.

The volumetric type is a method to feel the perspective of the depth direction by psychological factors and suction effects. This volumetric type can be adapted to a three-dimensional computer graphics which displays the image by calculation perspective, overlap, shading, contrast, and movement by calculation, or to an eye Max movie that provides a large screen with a wide viewing angle for the observer to cause an optical illusion like being sucked into the space.

The three-dimensional expression method, which is known as the most complete three-dimension image realization technology, can be a laser light reproduction holography or a white light reproduction holography.

The three-dimensional expression method is a method of feeling a three-dimensional effect using physiological factors of both eyes. This three-dimensional expression method uses stereography. For example, it utilizes the ability to sense a three-dimensional effect by generating spatial information on the front and rear of the display surface in the process of brain fusion of plane-related images including parallax information of the human left and right eyes. The three-dimensional expression method is largely divided into a glasses method and a non-glasses method.

The glasses method can include a lenticular method in which a lenticular lens plate in which cylindrical lenses are vertically arranged in front of the display panel and a parallax barrier method in which the parallax barrier is disposed in front of the display panel.

However, there can be a limitation in the 3D display device of the parallax barrier method. For example, in the 3D display device of the parallax barrier method, the user can watch the 3D image without glasses, but 2D and 3D conversion may be impossible or difficult. Of course, it is possible to implement the 2D image with the image passing through the parallax barrier. However, in this case, since the user cannot detect the image blocked by the parallax barrier, the luminance can be lowered.

SUMMARY OF THE INVENTION

An object of this invention is to provide a parallax barrier and a display device capable of switching between 2D and 3D.

Another object of this invention is to provide the parallax barrier and the display device capable of minimizing luminance defects due to spacers by forming spacers formed on the parallax barrier in regions corresponding to each other and spaced apart from each other by a set distance from each other.

In order to achieve these objects and other features, the parallax barrier according to an example of this invention can include a first substrate and a second substrate, a liquid crystal layer between the first substrate and second substrate, at least one insulating layer on the first substrate, a first electrode on the second substrate, a second electrode and a third electrode on the insulating layer to generate electric field in order to transmit and block selectively an image, a plurality of first spacers on the first substrate, and a plurality of second spacers on the second substrate, wherein the first spacers and the second spacers are formed in regions corresponding to each to maintain gap between the first substrate and the second substrate, and wherein the first spacers are space apart from the corresponding second spacers by predetermined distance.

A first alignment layer and a second alignment layer can be respectively formed on the first substrate and the second substrate, and a polarizing plate can be disposed over a top surface of the second substrate. An optical axis direction of the polarizing plate can be parallel to the alignment direction of the first alignment layer and the second alignment layer to transmit the image in the region that the electric field is not applied.

The image can include a left-eye image and a right-eye image and different voltages are applied to the second electrode and the third electrode to form a block region and a transmission region One second electrode and one third electrode can respectively form one block region and one transmission region, and a plurality of second electrodes and a plurality of third electrodes can respectively form one block region and one transmission region.

A black matrix can be formed in a region between the second electrode and the third electrode on the second substrate to block the image therethrough and the first spacer and the second spacer can be disposed in regions corresponding to the black matrix.

The first spacer and the second spacer can have a cylindrical shape, an elliptical column shape, or a polygonal column shape, and the width of the first spacer and the second spacer can decrease toward a center of the liquid crystal layer.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE EMBODIMENTS

Advantages and features of the present disclosure and methods for achieving them will be made clear from embodiments described in detail below with reference to the accompanying drawings. The present disclosure can, however, be implemented in many different forms and should not be construed as being limited to the embodiments set forth herein, and the embodiments are provided such that this disclosure will be thorough and complete and will fully convey the scope of the present disclosure to those skilled in the art to which the present disclosure pertains, and the present disclosure is defined only by the scope of the appended claims.

Shapes, sizes, ratios, angles, numbers, and the like disclosed in the drawings for describing the embodiments of the present disclosure are illustrative, and thus the present disclosure is not limited to the illustrated matters. The same reference numerals refer to the same components throughout this disclosure. Further, in the following description of the present disclosure, when a detailed description of a known related art is determined to unnecessarily obscure the gist of the present disclosure, the detailed description thereof will be omitted herein. When terms such as "including," "having," "consisting of," and the like mentioned in this disclosure are used, other parts can be added unless the term "only" is used herein. When a component is expressed as being singular, being plural is included unless otherwise specified.

In analyzing a component, an error range is interpreted as being included even when there is no explicit description.

In describing a positional relationship, for example, when a positional relationship of two parts is described as being "on," "above," "below," "next to," or the like, unless "immediately" or "directly" is not used, one or more other parts can be located between the two parts.

In describing a temporal relationship, for example, when a temporal predecessor relationship is described as being "after," "subsequent," "next to," "prior to," or the like, unless "immediately" or "directly" is not used, cases that are not continuous can also be included.

Although the terms first, second, and the like are used to describe various components, these components are not substantially limited by these terms. These terms are used only to distinguish one component from another component. Therefore, a first component described below can substantially be a second component within the technical spirit of the present disclosure.

In describing components of the specification, the terms first, second, A, B, (a), (b), and the like can be used. These terms are intended to distinguish one component from other components, but the nature, sequence, order, or number of the components is not limited by those terms. When components are disclosed as being "connected," "coupled," or "in contact" with other components, the components can be directly connected or in contact with the other components, but it should be understood that another component(s) could be "interposed" between the components and the other components or could be "connected," "coupled," or "contacted" therebetween.

In the specification, a "display device" can include display devices in a narrow sense, such as liquid crystal modules (LCMs), OLED modules, and quantum dot (QD) modules, and the like which include display panels and drivers for driving the display panels. In addition, the display device can also include laptop computers, televisions, and computer monitors which are complete products or final products including LCMs, OLED modules, QD modules, or the like, equipment displays including automotive displays or other types of vehicles, and set electronic devices, set devices, or set apparatuses such as mobile electronic devices such as smart phones or electronic pads.

Thus, the display device in the specification can include display devices in a narrow sense, such as LCMs, OLED modules, QD modules, or the like, and application products or set devices which are end consumer devices, which include the LCMs, the OLED modules, the QD modules, or the like.

In addition, in some cases, it can be separately expressed that LCMs, OLED modules, and QD modules, which include display panels and drivers, are expressed as "display devices" in some cases, and electronic devices as complete products including the LCMs, the OLED modules, or QD modules are expressed as "set devices." For example, the display device in a narrow sense can be a concept including a display panel such as a liquid crystal display (LCD) panel, an OLED panel, or a QD display panel, and a source printed circuit board (PCB) which is a controller for driving the display panel, and the set device can be a concept further including a set PCB which is a set controller which is electrically connected to the source PCB to control an entirety of the set device.

The display panel used in the present embodiments can employ all types of display panels such as a liquid crystal display panel, an OLED panel, a QD display panel, an electroluminescent display panel, and the like. However, the present disclosure is not limited to a specific display panel of which a bezel can be bent with a flexible substrate for an OLED panel of the present embodiment and a backplane support structure below the flexible substrate. In addition, the display panel used in the display device according to the various embodiments of the present disclosure is not limited to a shape or size of the display panel.

For example, when the display panel is an OLED panel, the display panel can include a plurality of gate lines, a plurality of data lines, and a plurality of pixels formed in intersection regions between the gate lines and the data lines. In addition, each of the pixels can include an array including a thin film transistor (TFT) which is an element for selectively applying a voltage to each pixel, an OLED layer on the array, and an encapsulation substrate or an encapsulation layer, which is disposed on the array to cover the OLED layer. The encapsulation layer can protect the TFT and the OLED layer from an external impact and prevent moisture or oxygen from infiltrating into the OLED layer. In addition, a layer formed on the array can include an inorganic light emitting layer, e.g., a nano-sized material layer or a quantum dot.

Hereinafter, embodiments of this invention will be described in detail with reference to the accompanying drawings. All components of each display device according to all embodiments of the present invention are operatively coupled and configured.

Figure 1:
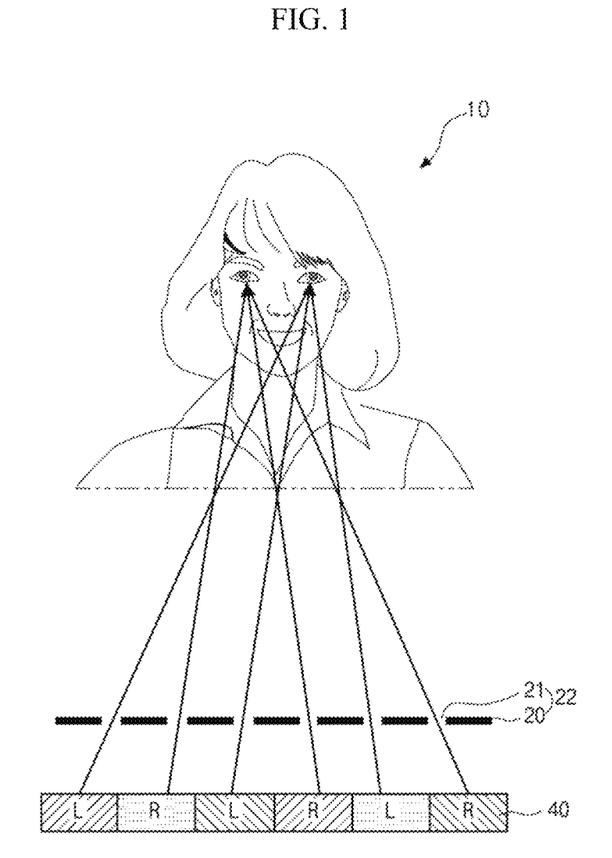
FIG. 1 is an exemplary view schematically showing the concept of an operation of a barrier type 3D display device according to an embodiment of this invention.

FIG. 1 is an exemplary view schematically illustrating the concept of an operation of the barrier type 3D display device according to an embodiment of the invention.

As shown in FIG. 1, the barrier type 3D display device according to the embodiment of the invention includes a display panel 40 for displaying simultaneously the left eye-image and the right eye-image and a parallax barrier 20 at the front of the display panel 40.

A plurality of left eye-pixels L and right eye-pixels R are alternatively disposed in the display panel 40 and the parallax barrier 20 is disposed between the display panel 40 and the user 30.

The parallax barrier 20 includes a plurality of barriers 21 and a plurality of slits 22 between the barriers 21. The left eye-image and the right eye-image are separated by the parallax barrier 20 and then displayed simultaneously on the screen of the 3D display device.

In this 3D display device, the left eye-image displayed on the left eye-pixel L of the display panel 40 reaches the left eye of the user 30 through the slit 22 of the parallax barrier 20. The right eye-image displayed on the right eye-pixel R of the display panel 40 reaches the right eye of the user 30 through the slit 22 of the parallax barrier 20. The images for the left and right eyes contain separate images in consideration of the human-detectable parallax, respectively, and the user 30 recognizes the 3D image by combining the two images.

Figure 2:
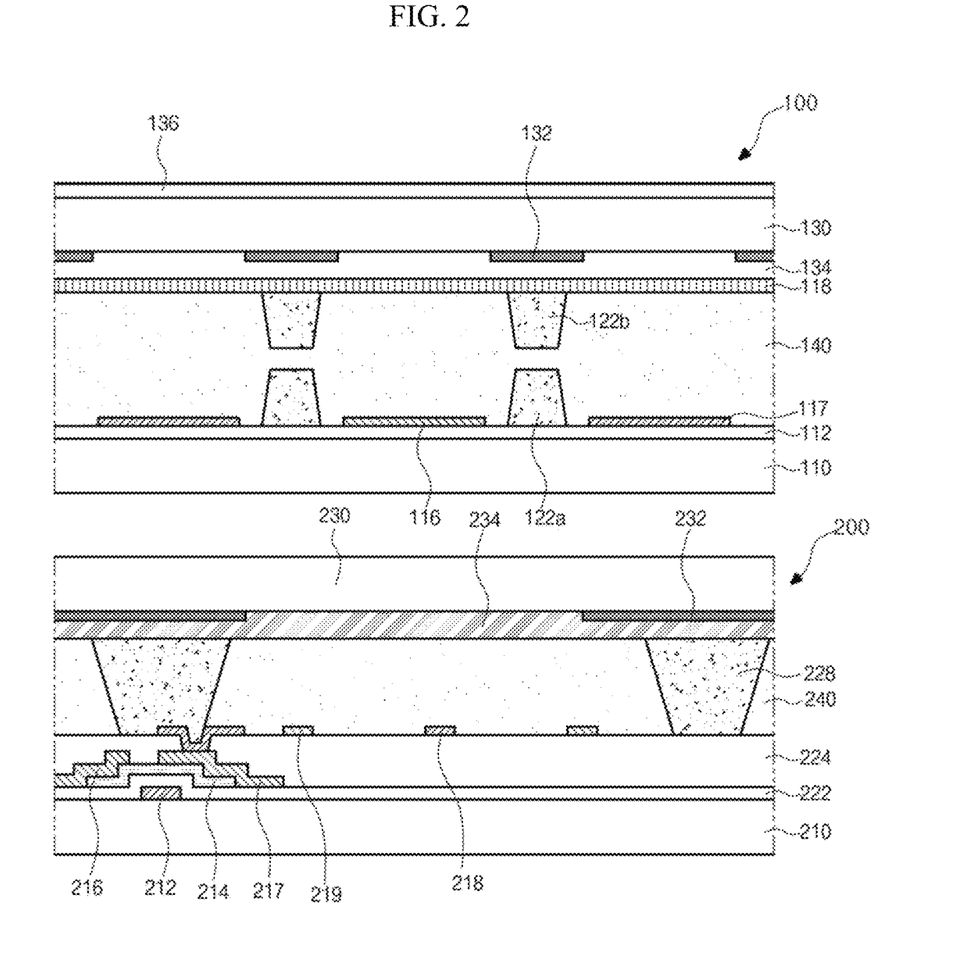
FIG. 2 is a view specifically showing the structure of the 3D display device according to an embodiment of this invention.

FIG. 2 is a view showing the detail structure of the 3D display device of an example of this invention.

The display device of this invention is a display device capable of watching in 2D image and 3D image. In order to enable viewing in 2D image and 3D image, in the parallax barrier type 3D display device of this invention, a barrier, a slit, and a switchable parallax barrier in which the slit is variable are used. In this switchable parallax barrier, it is possible to watch 2D image and 3D image without decrease of luminance.

As shown in FIG. 2, the 3D display device according to an example of this invention includes a display panel 200 and a switchable parallax barrier 100 in the front of the display panel to display the 2D image and 3D image by blocking and transmitting selectively the left eye-image and the right eye-image from the display panel 200.

In the display panel 200, a left eye pixel for displaying image information for the left eye and a right eye pixel for displaying image information for the right eye are alternately formed.

A plurality of left eye-pixels for displaying the left eye-image and a plurality of right eye-pixels for displaying the right eye-image are alternatively disposed in the display panel 200. The display panel can be various flat display panel such a liquid crystal display panel, an organic light emitting display panel, an electrophoresis display panel, a micro LED display panel, and a mini LED display panel.

The display panel 200 includes a first substrate 210, a second substrate 230, and a first liquid crystal layer 240 between the first and second substrates 210 and 230. In the display panel 200, a plurality of left pixels and right pixels displaying respectively left-eye image and right-eye image are alternately disposed in matrix form, and the left-eye pixel and the right-eye pixel have substantially same structure. Thus, hereinafter, only one pixel is showed for convenience of description.

The thin film transistor is disposed on the first substrate 210. The thin film transistor includes a gate electrode 212 on the first substrate 210, a gate insulating layer 222 over the first substrate 210 to cover the gate electrode 212, a semiconductor layer 214 on the gate insulating layer 222, a source electrode 216 and a drain electrode 217 on the semiconductor layer 214, a passivation layer 224 over the gate insulating layer 222 to cover the source electrode 216 and the drain electrode 217, and a pixel electrode 218 and a common electrode 219 on the passivation layer 224.

The gate electrode 212 can be formed by depositing a metal such as Cr, Mo, Ta, Cu, Ti, Al, and Al alloy by a sputtering method and etching the metal by an etching process, and the gate insulating layer can be consist of a single layer of inorganic insulating material such as SiOx and XiNx or double inorganic layer of SiOx or SiNx.

The semiconductor layer 217 can be formed of amorphous silicon, crystalline silicon, or an oxide semiconductor, but is not limited thereto. The semiconductor layer 217 can include a channel region at central region and source and drain regions that are impurity-doped layers on both sides of the channel region.

The passivation layer 224 can be formed of the single organic layer such as photo acryl and a plurality of layers including the inorganic layer and the organic layer. Further, the source electrode 216 and the drain electrode 217 can be formed by depositing and etching the metal such as Cr, Mo, Ta, Cu, Ti, Al or Al alloy, but is not limited thereto. The source electrode 216 and the drain electrode 217 can be formed by various metals.

The pixel electrode 218 and the common electrode 219 are formed in a plurality of long strips, and are repeatedly arranged to be spaced apart from each other by a predetermined distance. The pixel electrode 218 and the common electrode 219 are formed of a transparent metal oxide such as indium tin oxide (ITO) or indium zinc oxide (IZO), but are not limited thereto.

Further, the pixel electrode 218 and the common electrode 219 can be formed in various shapes. For example, the pixel electrode 218 and the common electrode 219 can be formed on different layers, and the pixel electrode 218 and the common electrode 219 can be formed on different layers. In case where the pixel electrode 218 and the common electrode 219 are disposed on different layers, one can be formed in a dummy shape and the other can be formed in a plurality of strips to be spaced apart from each other by a predetermined distance.

When an image signal is applied to the pixel electrode 218 through the thin film transistor, an electric field parallel to the surface of the first substrate 210 is formed between the pixel electrode 218 and the common electrode 219.

A first black matrix 232 and a color filter layer 234 are formed over a second substrate 230. The first black matrix 232 is used to block light leakage through a non-image display area, for example, a wiring formation area such as a gate line or a data line, and an area between pixels. The first black matrix 232 can be formed of an opaque metal such as TiO or TiOx, a metal oxide, or a black resin.

The color filter layer 234 is formed in the pixel between the first black matrices 232 and transmits only light of a set wavelength to realize color. In this case, the color filter layer 234 can include an R (Red) color filter layer, a G (Green) color filter layer, and a B (Blue) color filter layer, but is not limited thereto.

The first substrate 210 and the second substrate 230 are spaced apart from each other by a first spacer 228, and a first liquid crystal layer 240 is formed therebetween. At this time, a sealant is applied to the outer regions of the first and second substrates 210 and 230 to attach the first and second substrates 210 and 230 for each other and to seal the first liquid crystal. The first liquid crystal layer 240 can use twisted nematic (TN) liquid crystal, but is not limited thereto.

The first spacer 228 is disposed on the color filter layer 234. In this case, the first spacer 228 is in contact with the structural object of the first substrate 210 to constantly maintain a cell gap between the first substrate 210 and the second substrate 230.

A first polarizing plate and a second polarizing plate of which a light absorption axis or a light transmission axis parallel or perpendicular to each other can be disposed at the outer surface of the first substrate 210 and the second substrate 230, for example, on the outer surface of the liquid crystal panel 200.

Further, a first alignment layer and a second alignment layer can be respectively disposed on the first substrate 210 and the second substrate 230 in contact with the first liquid crystal layer 240 to align the liquid crystal molecules of the first liquid crystal layer 240 in a predetermined direction. In addition, the liquid crystal molecules of the first liquid crystal layer 240 can be aligned by other aligning method such as photo aligning method, without the first and second alignment layer.

In the liquid crystal panel 200 having the above configuration, when light is supplied from a light source disposed below, for example, a backlight, the arrangement of liquid crystal molecules is controlled according to the input image signal, so that transparent ratio of the light transmitting through the first liquid crystal layer 240 is controlled to display the left-eye image or the right-eye image of a desired color.

Referring back to FIG. 2, the variable parallax barrier 100 includes a third substrate 110, a fourth substrate 130, and a second liquid crystal layer 140 therebetween.

An insulating layer 112 is formed on the third substrate 110 includes, and a plurality of first and second electrodes 116 and 117 are formed on the insulating layer 112. Although the insulating layer 112 is made of a single layer in the figure, the insulating layer 112 can be made of a plurality of layers. The insulating layer 112 can be made of inorganic material or organic material. Further, the insulating layer 112 can be composed of organic layer/inorganic layer or inorganic layer/inorganic layer.

The first electrode 116 and the second electrode 117 can be formed by transparent metal oxide such as ITO and IZO. The first electrode 116 and the second electrode 117 can be disposed on the same layer. In case where the insulating layer 112 is made of the single layer, the first electrode 116 and the second electrode 117 is disposed on the single layer. In case where the insulating layer 112 is made of the double layer, the first electrode 116 and the second electrode 117 can be disposed on the same layer, or the first electrode 116 and the second electrode 117 can be disposed on the different layers of the insulating layer 112. The first electrode 116 and the second electrode 117 are disposed to be spaced apart from each other.

The first electrode 116 and the second electrode 117 are connected to the outer driving circuit through a connecting layer so that the voltage is applied to the first electrode 116 and the second electrode 117. In this case, the different voltages are respectively applied to the first electrode 116 and the second electrode 117.

A second black matrix 132 is formed inside the fourth substrate 130, for example, on the surface facing the first substrate 110. The second black matrix 132 is made of an opaque metal compound such as CrO or CrOx or a black resin. The second black matrix 132 is formed to be aligned with the region between the first electrode 116 and the second electrode 117 to block the space between the first electrode 116 and the second electrode 117.

A planarization layer 134 is formed in the whole area of the fourth substrate 130 to cover the second black matrix 132 and the third electrode 118 is formed on the planarization layer 134. The third electrode 118 made of transparent conductive material such as ITO or IZO is formed in the whole area of the second substrate 180.

Second spacers 122a and third spacers 122b are respectively formed on the third substrate 110 and the fourth substrate 130. The corresponding second spacer 122a and the third spacer 122b are aligned to maintain the cell gap between the third substrate 110 and fourth substrate 130.

The second spacer 122a and the third spacer 122b are spaced apart from each other by a predetermined distance. When a pressure is applied to the third substrate 110 and the fourth substrate 130, the second spacer 122a and the third spacer 122b are in contact with each other, so that the defect caused by the excessive pressure to the third substrate 110 and the fourth substrate 130 can be prevented. Accordingly, the cell gap between the second spacer 122a and the third spacer 122b can be constantly maintained, and the deformation of the third substrate 110 and the fourth substrate 130 caused by the pressure can be prevented.

The second spacer 122a and the third spacer 122b can be formed one per pixel of the display panel 200 or can be formed in plurality.

The second spacer 122a and the third spacer 122b can be formed of a polymer but are not limited thereto. In this case, the second spacer 122a and the third spacer 122b contain reinforcing agents such as pigments and beads to improve the rigidity and elasticity of the second spacer 122a and the third spacer 122b. By the improvement of the rigidity and elasticity, the damage or deformation of the second spacer 122a and the third spacer 122b can be prevented when the second spacer 122a and the third spacer 122b are in contact with each other by applying pressure.

In the figure, the second spacer 122a and the third spacer 122b are formed symmetrically to each other, and the width of the second spacer 122a and the third spacer 122b becomes narrower from the third substrate 110 and the fourth substrate 130 to the center. However, the second spacer 122a and the third spacer 122b may not be formed symmetrically but can have different shapes. For example, one spacer of the second spacer 122a and the third spacer 122b can be formed to have a larger width than the other spacer, and one of the second spacer 122a and the third spacer 122b can have a higher height. In addition, the second spacer 122a can be formed in a cylindrical shape, and the third spacer 122b can be formed in a polygonal column shape.

The common voltage is applied to the third electrode 118 and the driving voltage is applied to the first electrode 116 and the second electrode 117. The electric field is applied to the liquid crystal layer 140 by the potential difference between the third electrode 118 and the first and second electrodes 116 and 117, and the liquid crystal molecules 192 of the liquid crystal layer 140 by the electric field are arranged along the electric field.

The voltage can be applied to the first electrode 116 and the second electrode 117 in an active manner and a passive manner. For example, the voltage can be actively applied to the first electrode 116 and the second electrode 117 by operating the switching thin film transistor, or the voltage can be passively applied to the first electrode 116 and the second electrode 117 through a connection wire connected simply to the first electrode 116 and the second electrode 117.

A third alignment layer and a fourth alignment layer are respectively formed on the third substrate 110 and the fourth substrate 130, so that the liquid crystal molecules of the second liquid crystal layer 140 are aligned along the alignment direction of the third alignment layer the fourth alignment layer. Further, the liquid crystal of the second liquid crystal layer 140 can use a twist nematic liquid crystal.

The alignment directions of the third and fourth alignment layers formed on the third and fourth substrates 110 and 130 are perpendicular to each other so that the liquid crystal molecules of the second liquid crystal layer 140 can be aligned in twist shape from the substrate 110 to the fourth substrate 130. Further, the alignment directions of the third and fourth alignment layers formed on the third and fourth substrates 110 and 130 are parallel to each other so that the liquid crystal molecules can be aligned in the same direction in the whole second liquid crystal layer 140.

A polarizing plate 136 is attached to the outer surface of the fourth substrate 130. The polarizing plate 136 blocks and transmits the light incident through the second liquid crystal layer 140 to display 3D image. In this case, the optical axis direction of the polarizing plate 136 is dependent upon the alignment directions of the alignment layer on the third substrate 110 and the fourth substrate 130. The optical axis direction of the polarizing plate 136 of this invention is parallel to the alignment direction of the alignment layer, so that the optical axis direction of the polarizing plate 198 is parallel to the arrangement direction of the liquid crystal molecules.

In the display device configured as described above, the parallax barrier 100 plays the same role as the parallax barrier 20 shown in FIG. 1, which will be described in detail as follows.

Figure 3:
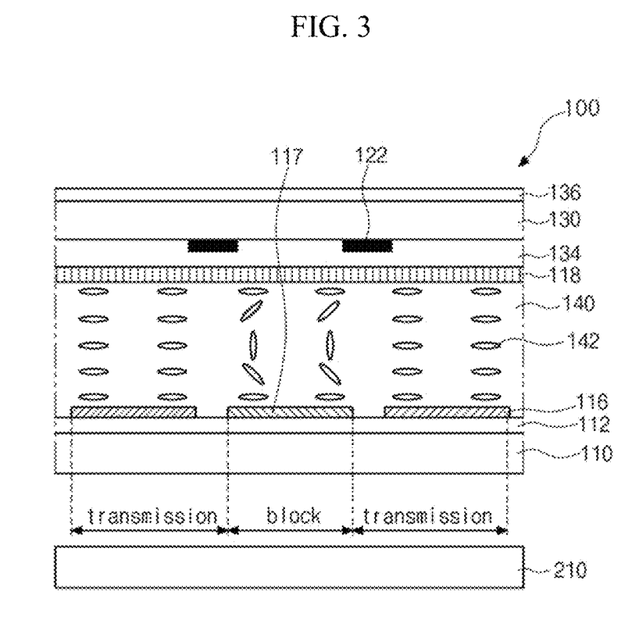
FIG. 3 is a view showing a 2D image and a 3D image by blocking and transmitting light by a parallax barrier according to an embodiment of this invention.

FIG. 3 is a view illustrating the block and transmittance of the light by the parallax barrier 100 according to this invention to display 2D image and 3D image.

As shown in FIG. 3, in one example of the invention, the electric field is formed between the first and second electrodes 116 and 117 of the first substrate 110 and the third electrode 118 of the second substrate 130 and is applied to the liquid crystal layer 140.

The electric is generated by the relative voltage difference between the third electrode 118 and the first and second electrodes 116 and 117. For example, when the common voltage is applied to the third electrode 118, the electric filed is not generated if the voltage applied to one electrode of the first electrode 116 and the second electrode 117 is the same as the common voltage and the electric field is generated if the voltage applied to one electrode of the first electrode 116 and the second electrode 117 is different from the common voltage. For example, the electric field is generated when the voltage applied to the first electrode 116 and the second electrode 117 is higher or less than the common voltage. Hereinafter, this will be referred to as a driving voltage. At this case, the common voltage can be OV, or more or less voltage, that is ±V. Hereinafter, a case in which the common voltage is OV will be described for convenience of description, but the common voltage can be greater than or equal to OV.

The left and right-eye images of the display panel 200 are incident to the barrier panel 100 which is disposed in front of the display panel 200. When the same voltage as the common voltage is applied to the first electrode 116 and the second electrodes 117, the electric field is not formed over the entire second liquid crystal layer 140. Accordingly, the liquid crystal molecules 142 of the entire second liquid crystal layer 140 are arranged along the alignment directions of the third alignment layer and the fourth alignment layer.

Accordingly, an image in the same optical axis direction as the alignment direction of the second liquid crystal molecules 140 among the images incident from the display panel 200 transmits through the second liquid crystal layer 140. On the other hand, since the optical axis direction of the polarization plate 136 is parallel to the alignment direction of the liquid crystal molecule 142, all the optical components of the left and right-eye images passing the second liquid crystal layer 140 passes the polarization plate 136 and then reaches to the user. In other word, since the optical components of the left and right eyes reaches to both eyes of the user, the user can recognize the 2D image.

When the driving voltage is applied to the first electrode the voltage having the intensity same as the common voltage is applied to the second electrode 117, the electric field is applied to region of the second liquid crystal layer 140 corresponding the first electrode 116 and the electric field is not applied to the region of the second liquid crystal layer 140 corresponding to the second electrode 117. Since the electric field is not applied to the liquid crystal molecules 142 of the second liquid crystal layer 140 corresponding the second electrode 117, the liquid crystal molecules 142 are aligned along the alignment direction of the alignment layer in this region. Further, the liquid crystal molecules 142 of the second liquid crystal layer 140 corresponding to the first electrode 116 is aligned along the electric field vertical to the surface of the first substrate 110 and thus the liquid crystal molecules 142 of the second liquid crystal layer 140 is vertically arranged to the surface of the first substrate 110 in this region.

When the left-eye image and the right-eye image are output from the display panel 200, the optical component parallel to the alignment direction of the alignment layer among the left-eye image and the right-eye image incident into the second electrode 117 passes through the second liquid crystal layer 140 and then reaches the polarizing plate 136. At this time, since the optical components of the left-eye image and the right-eye image and the optical axis directions of the polarizing plate 136 are parallel, the optical components of the left-eye image and the right-eye image reach respectively the user's left or right eye through the polarizing plate 136.

The left-eye image and the right-eye image from the display panel 200 is incident to the first electrode 116, only the optical component parallel to the vertical electric field among the left-eye image and the right-eye image passes the second liquid crystal layer 140 and then reaches the polarization plate 136. Since the optical axis of the polarization plate 136 is not parallel to the optical component of the left-eye image and the right-eye image passing the second liquid crystal layer 140, the optical component of the left-eye image and the right-eye image is blocked by the polarization plate 136 and then not reach the user's eye.

As described above, in the variable parallax barrier 100 of this invention, the first electrode 116 blocks the transmission of the light by applying the driving voltage and thus the region where the first electrode 116 is formed is a block region. Further, since the voltage same as the common voltage is applied to the second electrode 117, the region where the second electrode 117 is formed is a transmission region. Accordingly, the left-eye image and the right-eye image are selectively transmitted in the transmission to display the 3D image.

The block region shown in FIG. 3 corresponds to the barrier of the variable parallax barrier of FIG. 1 and the transmission corresponds to the slit of the variable parallax barrier of FIG. 1. Thus, the left-eye image from the display panel 200 transmits the transmission region and reaches the user's left eye, while the right-eye image is blocked by the block region and does not reach the user's left eye. Further, the right-eye image from the display panel 200 transmits the transmission region and reaches the user's right eye, while the left-eye image is blocked by the block region and does not reach the user's right eye. These reached left and right-eye images are combined so that the user can recognize the 3D image.

As described above, according to an example of the present invention, the 2D image can be displayed by applying the same voltage as the common voltage to the first electrode 116 and the second electrode 117. Further, the 3D image can be displayed by applying the driving voltage to the first electrode 116. Accordingly, the 2D and 3D images can be displayed on one display device.

Meanwhile, in the above description, the voltage is applied to the first electrode 116 so that the corresponding region becomes the blocking region, and no voltage is applied to the second electrode 117 so that the corresponding region becomes the transmissive region. However, the voltage can be applied to the second electrode 117 so that the corresponding region can become the blocking region, and no voltage can be applied to the first electrode 116 so that the corresponding region can become the transmission region. In other words, according to an example of the present invention, since the first electrode 116 and the second electrode 117 can be changed according to the user's position to be driven into the blocking region and the transmission region, the range of the left and right viewing angles can be improved.

The user's position can be detected by the eye tracking system and then driving voltage is applied to the first electrode 116 so that the user can watch the 3D image at his position. When the user is moved (thus, the user cannot watch the 3D image outside the allowed left and right viewing angles), the user can watch the 3D image by applying the voltage same as the common voltage to the first electrode and applying the driving voltage to the second electrode 117 to switch the block region and transmission region.

As described above, according to an example of the present invention, since the variable parallax barrier is used, the display device can be used as the switchable 2D/3D image display device, and the left and right viewing angle characteristics can be significantly improved.

In the figures and detailed description, the transmission region and the block region each consist of one electrode, but the transmission region and the block region can each consist of or include a plurality of electrodes.

On the other hand, in the parallax barrier 100 according to this invention, the second spacer 122a and the third spacer 122b are respectively formed on the third substrate 110 and the fourth substrate 140 and are spaced apart to face each other by a predetermined distance. The reason for this is as follows.

Figure 4:
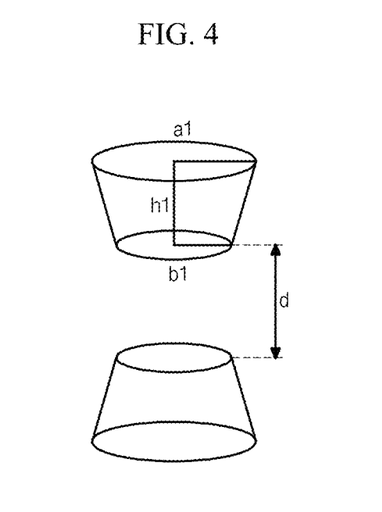
FIG. 4 is a view showing a spacer of the parallax barrier according to an embodiment of this invention.

FIG. 4 is a view showing the second spacer 122a and the third spacer 122b of the parallax barrier 100 according to this invention.

As shown in FIG. 4, the second spacer 122a and the third spacer 122b are each formed in a cylindrical shape. However, the second spacer 122a and the third spacer 122b are not limited to the cylindrical shape, but can be formed in an elliptical or polygonal column shape. The cross-sectional area of the second spacer 122a decreases from the bottom to the top, and the cross sectional area of the third spacer 122b decreases from the top to the bottom.

The second spacer 122a and the third spacer 122b can be respectively formed in different shapes and sizes, but hereinafter the cylindrical structure in which the second spacer 122a and the third spacer 122b are formed symmetrically with respect to the center surface adjacent to each other will be described for convenience of description. In the case of this structure, the height h1 and the maximum width a1 of the second spacer 122a and the third spacer 122b (the width of the side in contact with the first substrate 110 in the case of the second spacer 122a and the width on the side in contact with the second substrate 130 in the case of the spacer 122b) is the same.

Figure 5:
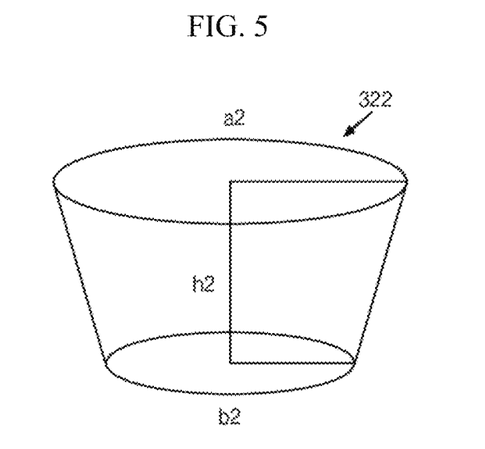
FIG. 5 is a view showing a spacer according to a comparative example according to this invention.

FIG. 5 is the view showing a spacer 322 according to a comparative example. In this case, the spacer 322 can be formed on the first substrate 110 and extend toward the second substrate 130, or can be formed on the second substrate 130 and extend toward the first substrate 110. For example, in the comparative example, the cell gap of the variable parallax barrier is constantly maintained by one spacer 322.

The second spacer 122a and the third spacer 122b according to this invention shown in FIG. 4 and the spacer 322 according to the comparative example shown in FIG. 5 will be compared and described as follows.

All the spacers according to this invention are formed at a predetermined inclination of a set angle. Accordingly, when the height of the spacer increases, the width of the spacer also increases.

The spacer 322 according to the comparative example is formed between the first substrate 110 and the second substrate 130 so that the height h2 of the spacer 322 is the same as the distance between the first substrate 110 and the second substrate 130. On the other hand, according to an example of the present invention, the cell gap of the variable parallax barrier 100 is maintained by the second spacer 122a and the third spacer 122b, and the second spacer 122a and the third spacer 122b are spaced apart from each other in predetermined distance d. Accordingly, the height h2 of the spacer 322 according to the comparative example is equal to the sum of the height h1 of the second spacer 122a and the third spacer 122b and the distance d between the second spacer 122a and the third spacer 122b (for example, h2=2h1+d).

In other word, the height h1 of the second spacer 122a and the third spacer 122b of this invention is ½ or less of the height h2 of the spacer 322 of the comparative example (h1<h2/2). Since the widths a1 and b1 of the second spacer 122a and the third spacer 122b are proportional to the height h1, the widths a1 and b1 of the second spacer 122a and the third spacer 122b of this invention are also ½ or less of the widths a2 and b2 of the spacer 322 of the comparative example (a1<a2/2, b1<b2/2).

As described above, since the widths a1 and b1 of the second spacer 122a and the third spacer 122b of this invention are much smaller than the width of the spacer 322 of the comparative example, the width of the spacer formation region is greatly reduced in the variable parallax barrier 100.

As the width of the spacer formation region is reduced, it is possible to prevent defects due to non-uniform luminance of the variable parallax barrier 100. Hereinafter, this will be described in detail with reference to the drawings.

Figure 6A:
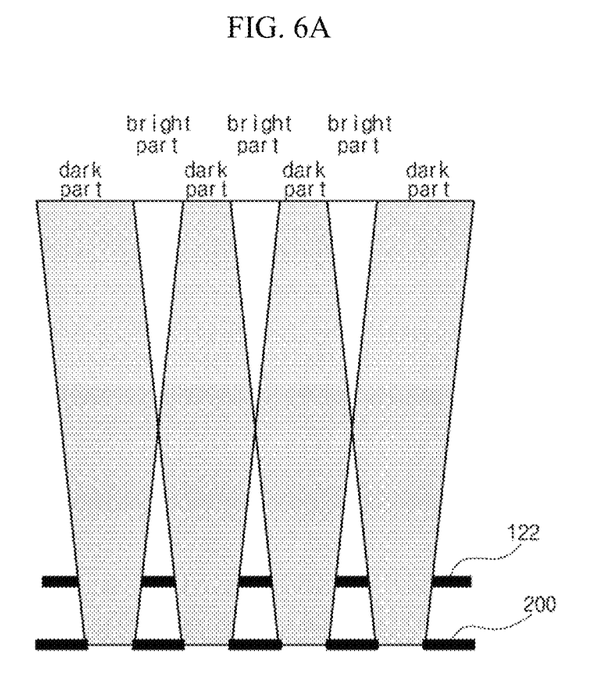
FIGS. 6A and 6B are diagrams showing respectively light transmission in the display device on which the variable parallax barrier is disposed and luminance distribution on the screen according to the comparative example of this invention.
Figure 6B:
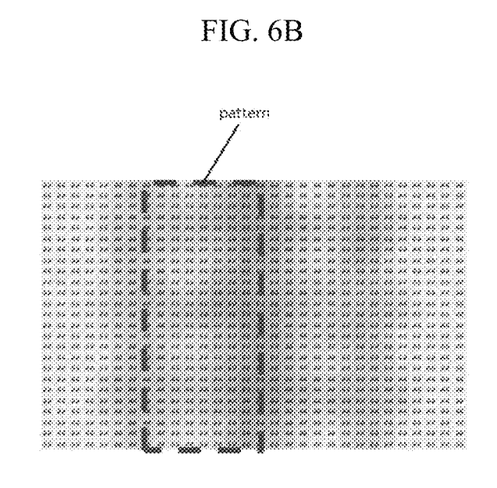
Figure 7A:
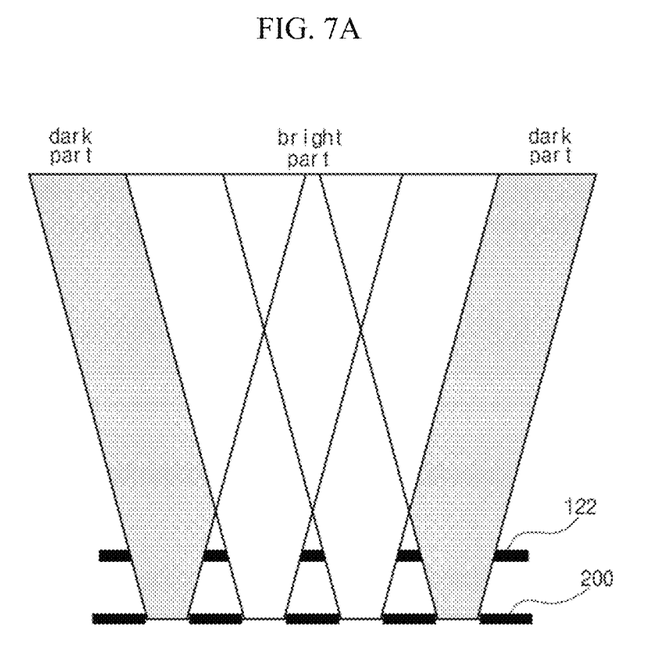
FIGS. 7A and 7B are diagrams showing respectively light transmission in the display device on which the variable parallax barrier is disposed and the luminance distribution on a screen according to an embodiment of this invention.
Figure 7B:
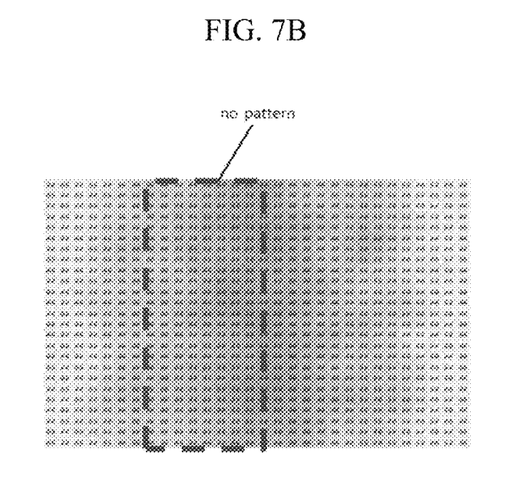

FIG. 6A is the view showing light transmission in the display device on which a variable parallax barrier is disposed according to the comparative example and FIG. 6B is the view showing luminance distribution on the screen according to the comparative example. FIG. 7A is the view showing light transmission in the display device on which a variable parallax barrier is disposed according to this invention and FIG. 7B is the view showing luminance distribution on the screen according to this invention.

In the comparative example, since the width of the spacer 322 is relatively wide, when the light emitted from the display panel 200 passes through the variable parallax barrier, a region where light is blocked by the spacer 322 is relatively wider so that the transmission width of the light passing through the transmission region of the variable parallel barrier is narrow. Accordingly, the transmitted light is overlapped only in a partial region so that the user recognizes alternately the bright part (overlapping region of transmitted light) and dark part (region where the transmitted light does not overlap) as shown in FIG. 6A, and as a result dark patterns (area marked in yellow) are generated on the screen as shown in FIG. 6B.

Further, the amount of the liquid crystal in the region where the spacer 322 is formed is decreased compared with the liquid crystal in other region and this decrease of the amount of the liquid crystal causes the phase difference in the region where the spacer 322. The liquid crystal molecules in the liquid crystal layer are arranged in the set direction, but the liquid crystal molecules near the spacer 322 are arranged in the direction varied from the set direction by interaction with the spacer 322.

The phase difference or the variation of arrangement of the liquid crystal molecule cause the light leakage in the variable parallax barrier, the dot is displayed in the region of the screen corresponding to the spacer 322 when the transmission region of the variable parallax barrier is opened as much as possible On the other hand, according to an example of the present invention, since width of the spacer 122a and 122b is much narrower than that of the spacer 322 of the comparative example (½ or less), the block region is much decreased when the light from the display panel 220 transmits the variable parallax barrier 100. Thus, since the overlap area of the transmission region is much increased by the increase of the width the light transmitting the transmission region. The most regions are recognized as a bright part by the user as shown in FIG. 7A, the dark part pattern (area marked in yellow) is significantly reduced compared to the comparative example as shown in FIG. 7B.

Further, although the amount of liquid crystal in the corresponding region is decreased by the spacers 122a and 122b compared to other regions, the decrease rate of the liquid crystal is reduced by the amount of width decrease compared to the spacer 322 of the comparative example. Therefore, although a phase difference occurs due to a decrease in the amount of liquid crystal in the variable parallax barrier 100 according to this invention, the phase difference is significantly reduced compared to the variable parallax barrier of the comparative example. In addition, although the arrangement direction of the liquid crystal molecules near the spacers 122a and 122b is varied in the set direction in the variable parallax barrier 100 according to this invention, the degree of variation is significantly reduced compared to the variable parallax barrier of the comparative example. Therefore, since it is possible to minimize the light leakage due to the occurrence of phase difference or the variation of the arrangement of liquid crystal molecules, the occurrence of gray points due to light leakage and the size thereof can be minimize when the transmission region of the variable parallax barrier 100 is opened as much as possible.

Accordingly, according to an example of the present invention, the second spacer 122a and the third spacer 122b are respectively formed on the third substrate 110 and the fourth substrate 130 to be spaced apart from each other by the predetermined distance, so that the luminance non-uniformity by the variable parallax barrier 100 can be minimized.

On the other hand, in the variable parallax barrier 100 according to this invention, by forming the second spacer 122a and the third spacer 122b to be spaced apart from each other, when pressure is applied to the third and fourth substrates 110 and 130, the second spacer 122a and the third spacer 122b can absorb the pressure so that the deformation of the variable parallax barrier 100 by the pressure can be prevented.

In particular, when pressure is applied to the third and fourth substrates 110 and 130, the second spacer 122a and the third spacer 122b are not contacted with the structure of third substrate 110 and the structure of the fourth substrate 130, but the second spacer 122a and the third spacer 122b are contacted for each other at their end surfaces. Thus, the impact caused by the pressure is not applied to the structure of the third substrate 110 and the structure of the fourth substrate 130.

For example, in case where the spacer of the variable parallax barrier 100 is formed as one spacer to maintain the cell gap and is formed on the third substrate or the fourth substrate to be spaced apart from the structure of other substrate as shown in FIG. 5, the spacer of this structure can also absorb the pressure when the pressure is applied to the third substrate and the fourth substrate from the outside. However, the spacer of this structure can be contacted with the structure of the third substrate or the structure of the fourth substrate by the pressure from the outside. By the contact between the spacer and the structure of the substrate, the impact is applied to the structure of the substrate, so that the structure of the substrate, for example the alignment layer etc., can be damaged and thus the variable parallax barrier can be defective.

However, in the variable parallax barrier 100 of this invention, the second spacer 122*a* and the third spacer 122*b* are respectively formed on the third substrate 110 and the fourth substrate 130, and the second spacer 122*a* and the third spacer 122*b* only contact each other but do not contact the substrate structure when an external force is applied, so that the damage to the substrate structure due to impact does not occur.

Although the embodiments of this invention described above have described the variable parallax barrier having specific structure and the display device having the same, this invention is not limited to the variable parallax barrier having the specific structure and the display device. For example, in this invention, as long as the second spacer and the third spacer are respectively formed on the third and fourth substrates to maintain the cell gap of the variable parallax barrier, it can be applied to parallax barriers and display devices having various structures.

Accordingly, various modifications of this invention or structures that can be easily devised based on this invention should also be included in the scope of this invention. Accordingly, the scope of this invention should not be determined by the above detailed description, but should be determined by the appended claims.

What is claimed is:

1. A parallax barrier, comprising:
   a first substrate and a second substrate;
   a liquid crystal layer between the first substrate and the second substrate;
   at least one insulating layer on the first substrate;
   a first electrode on the second substrate;
   a second electrode and a third electrode on the insulating layer to generate electric field in order to transmit and block selectively an image;
   a plurality of first spacers on the first substrate; and.
   a plurality of second spacers on the second substrate,
   wherein the first spacers and the second spacers are formed in regions corresponding to each to maintain a gap between the first substrate and the second substrate,
   wherein a top surface of a first spacer from among the plurality of first spacers and a top surface of a corresponding second spacer from among the plurality of second spacers face each other, and wherein the top surface of the first spacer is spaced apart from the top surface of the corresponding second spacer by a predetermined distance in a thickness direction of the liquid crystal layer.

2. The parallax barrier of claim 1, further comprising:
   a first alignment layer and a second alignment layer having predetermined alignment directions, the first alignment layer and the second alignment layer being respectively formed on the first substrate and the second substrate; and
   a polarizing plate over a top surface of the second substrate, an optical axis direction of the polarizing plate being parallel to the alignment direction of the first alignment layer and the second alignment layer to transmit the image in the region that the electric field is not applied.

3. The parallax barrier of claim 1, wherein the image includes a left-eye image and a right-eye image.

4. The parallax barrier of claim 1, wherein different voltages are applied to the second electrode and the third electrode to form a block region and a transmission region.

5. The parallax barrier of claim 4, wherein one second electrode and one third electrode form one block region and one transmission region, respectively.

6. The parallax barrier of claim 4, wherein a plurality of second electrodes and a plurality of third electrodes form one block region and one transmission region, respectively.

7. The parallax barrier of claim 1, wherein a same voltage is applied to the second electrode and the third electrode to display a 2D image.

8. The parallax barrier of claim 1, further comprising a black matrix formed in a region between the second electrode and the third electrode on the second substrate to block the image therethrough.

9. The parallax barrier of claim 8, wherein one of the plurality of first spacers and one of the plurality of second spacers are disposed in regions corresponding to the black matrix.

10. The parallax barrier of claim 1, wherein one of the plurality of first spacers and one of the plurality of second spacers are formed symmetrically with each other.

11. The parallax barrier of claim 1, wherein the first spacer and the corresponding second spacer are formed symmetrically with each other.

12. The parallax barrier of claim 1, wherein one of the plurality of first spacers and/or one of the plurality of second spacers has a cylindrical shape, an elliptical column shape, or a polygonal column shape.

13. The parallax barrier of claim 1, wherein a width of one of the plurality of first spacers and/or a width of one of the plurality of second spacers decreases toward a center of the liquid crystal layer.

14. A display device, comprising:
   a display panel configured to display an image; and
   the parallax barrier according to claim 1, the parallax barrier being disposed on a front surface of the display panel to switch between a 2D image and a 3D image.

15. The display device according to claim 14, wherein the display panel includes a liquid crystal display panel, an organic light emitting display panel, a micro LED display panel, or a mini LED display panel.

16. The parallax barrier of claim 1, wherein the first spacer is contacted with the corresponding second spacer when a pressure is applied to at least one of the first substrate and the second substrate.

17. The parallax barrier of claim 1, wherein at least one of the first spacer and the corresponding second spacer includes a reinforcing agent.

18. The parallax barrier of claim 17, wherein the reinforcing agent includes a pigment or a bead.

* * * * *